April 7, 1931.  C. MUZYN  1,799,924
STORAGE APPARATUS
Filed April 29, 1927  4 Sheets-Sheet 1

April 7, 1931.   C. MUZYN   1,799,924
STORAGE APPARATUS
Filed April 29, 1927   4 Sheets-Sheet 2

Inventor
Clemens Muzyn
By
Attorney

April 7, 1931. C. MUZYN 1,799,924
STORAGE APPARATUS
Filed April 29, 1927 4 Sheets-Sheet 3
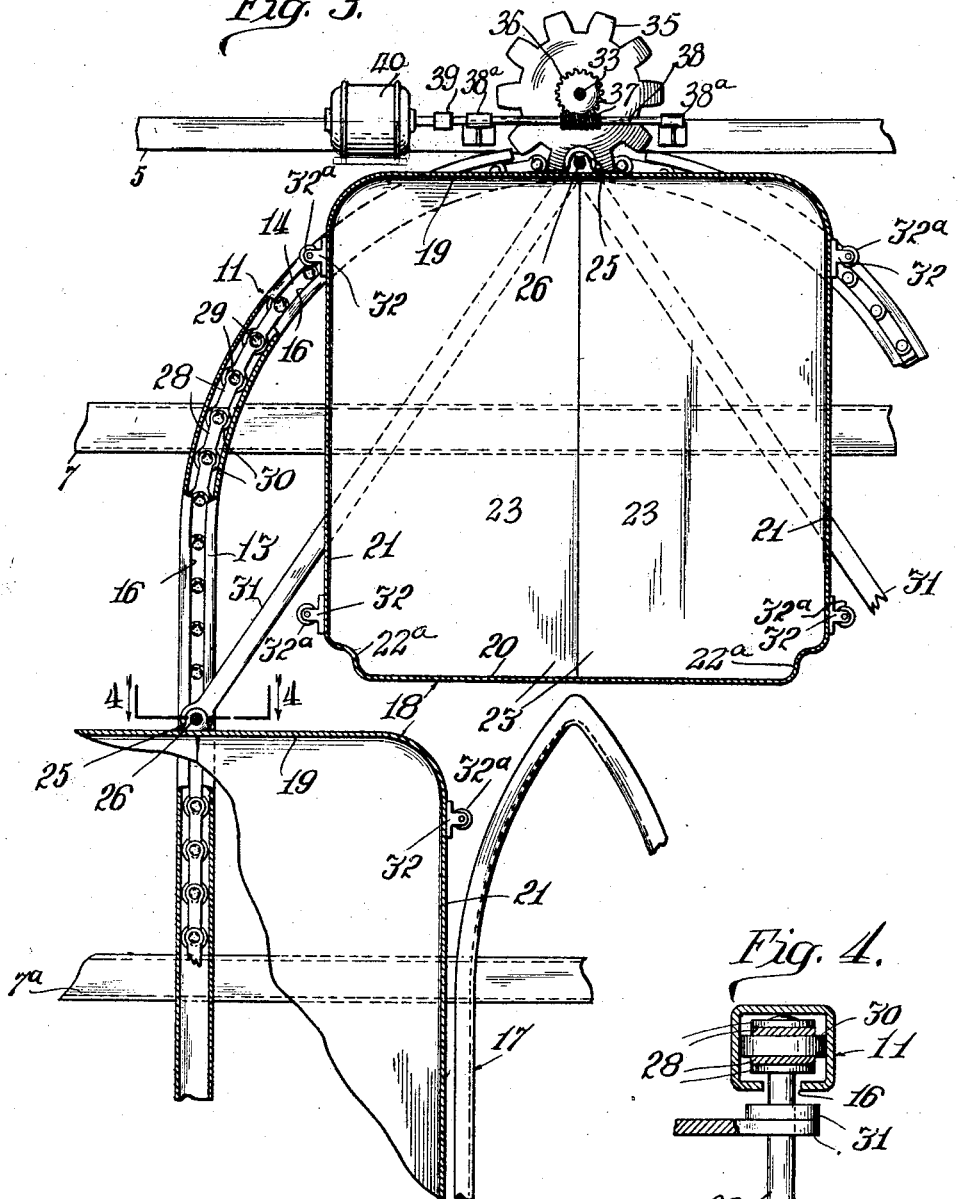
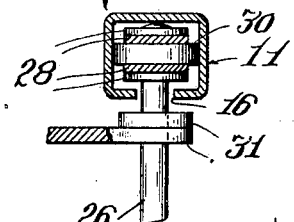
Inventor
Clemens Muzyn
By
Attorney April 7, 1931.  C. MUZYN  1,799,924
STORAGE APPARATUS
Filed April 29, 1927   4 Sheets-Sheet 4
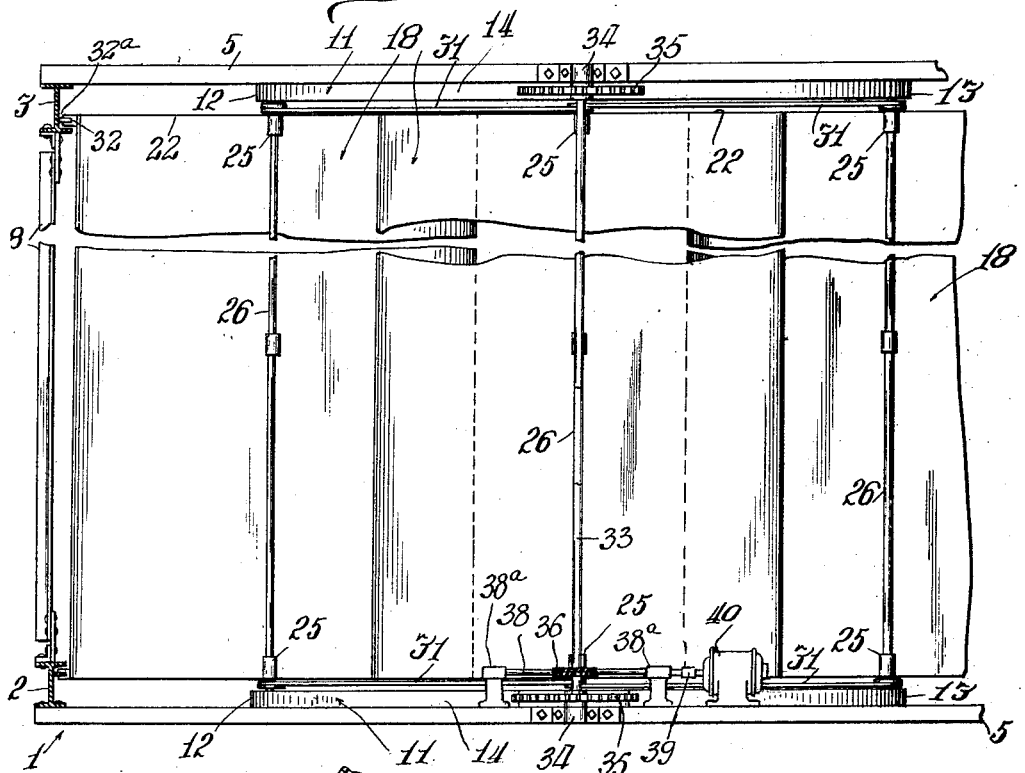
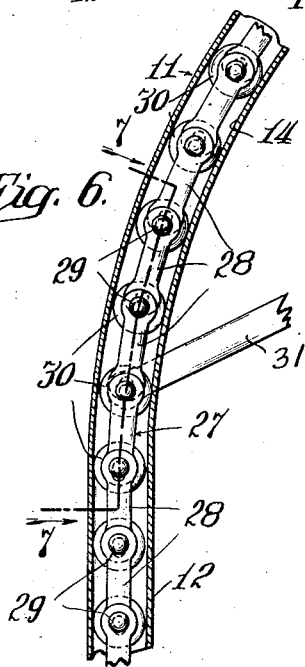
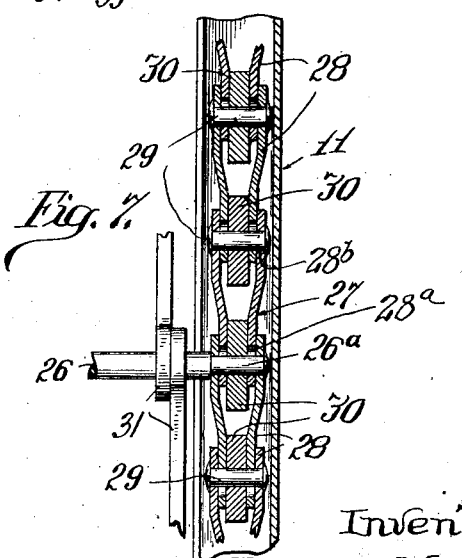
Inventor
Clemens Muzyn
By
Attorney Patented Apr. 7, 1931

1,799,924

UNITED STATES PATENT OFFICE

CLEMENS MUZYN, OF GARY, INDIANA

STORAGE APPARATUS

Application filed April 29, 1927. Serial No. 187,481.

This invention relates to improvements in storage apparatus and it consists of the matters hereinafter described and more particularly pointed out in the appended claims.

The primary object of the invention is to provide an apparatus especially adapted for the storage of automobiles, and the like in public garages which though occupying a minimum of space will have a maximum storage capacity.

A further object of the invention is to provide such an apparatus whereby automobiles may be quickly placed in and released from temporary storage, without delay and without the congestion usually attendant to such operation as is found in public garages at the present time.

Still another object of the invention is to provide such an apparatus in the form of an endless chain-like conveyor to which is operatively connected a plurality of individual storage containers or cages, any one of which may be readily brought into position with respect to an associated loading or unloading ramp in the garage building, in which my improved apparatus is installed.

Still another object of the invention is to provide such an apparatus, which includes a plurality of storage containers, into and from which an automobile may be readily driven, when the container is in operative position with respect to the loading and unloading ramp and wherein each container has doors through which the automobile may enter and leave and another door through which the operator may enter and leave the container.

Still another object of the invention is to provide a pair of endless tracks about which endless chains are trained, certain of the links of which are connected together by shafts, each of which supports a container, the chains being engaged by suitable driving sprockets for imparting movement thereto when so desired.

These objects of the invention as well as others, together with the many advantages thereof, will more fully appear as I proceed with my specification.

In the drawings:

Fig. 3 is a vertical detail section on an enlarged scale as taken on the line 3—3 of Fig. 2.

Fig. 4 is a detail horizontal sectional view on a further enlarged scale as taken on the line 4—4 of Fig. 3.

Fig. 5 is a horizontal sectional view on an enlarged scale as taken on the line 5—5 of Fig. 1 and shows the apparatus in plan elevation.

Fig. 6 is a view on an enlarged scale of parts shown in Fig. 3 and which will be more specifically referred to later.

Fig. 7 is a vertical detail sectional view as taken on the line 7—7 of Fig. 6.

In general, my improved apparatus which will be described as employed in the storage of automobiles in public garages, includes a skeleton frame work of structural members arranged in a manner to provide adjoining upright storage units or sections. Each section embodies front and rear endless tracks about which endless chains are trained and certain links of said chains are connected together by shafts, which in themselves are spaced apart by links of greater length and from each shaft is dependingly supported a container or cage adapted to hold an automobile, any one of which containers may be brought at will into the desired position with respect to a loading and unloading ramp arranged on the floor of the garage. When the proper cage or container is brought into position with respect to the ramp, the entrance doors of the cage are opened and the automobile is driven thereinto under its own power and the door is closed. A second door is provided in the cage for the exit of the driver after which the mechanism of the apparatus is set in motion and the cage moves away from the ramp into storage position and another cage takes its place either to receive another automobile or to permit the removal of the one it contains.

Figure 1:
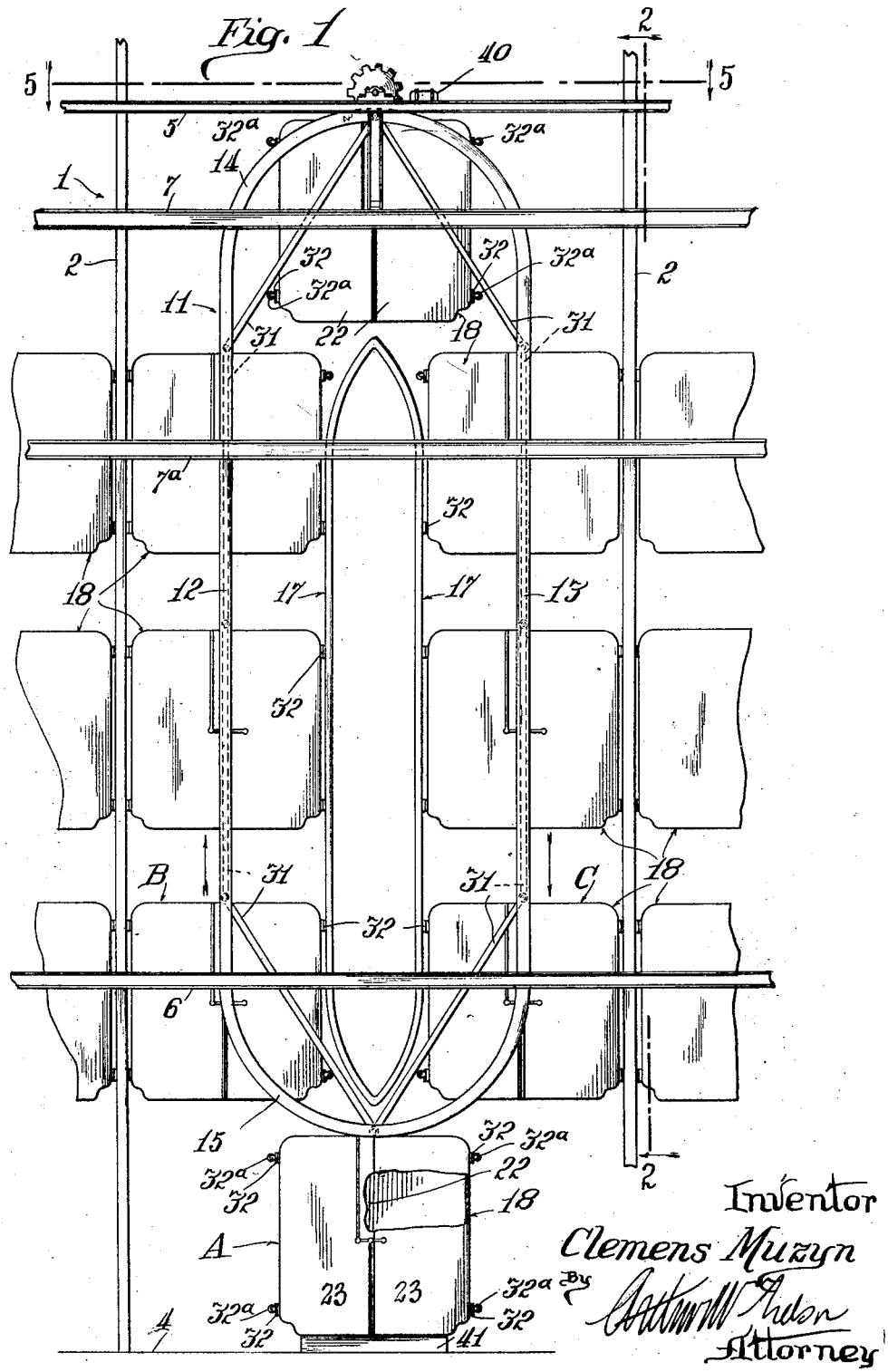
Fig. 1 is a view in front elevation of a storage apparatus embodying one form of my invention as when providing one of a plurality of units of such apparatus installed in a garage building for the storage of automobiles.
Figure 2:
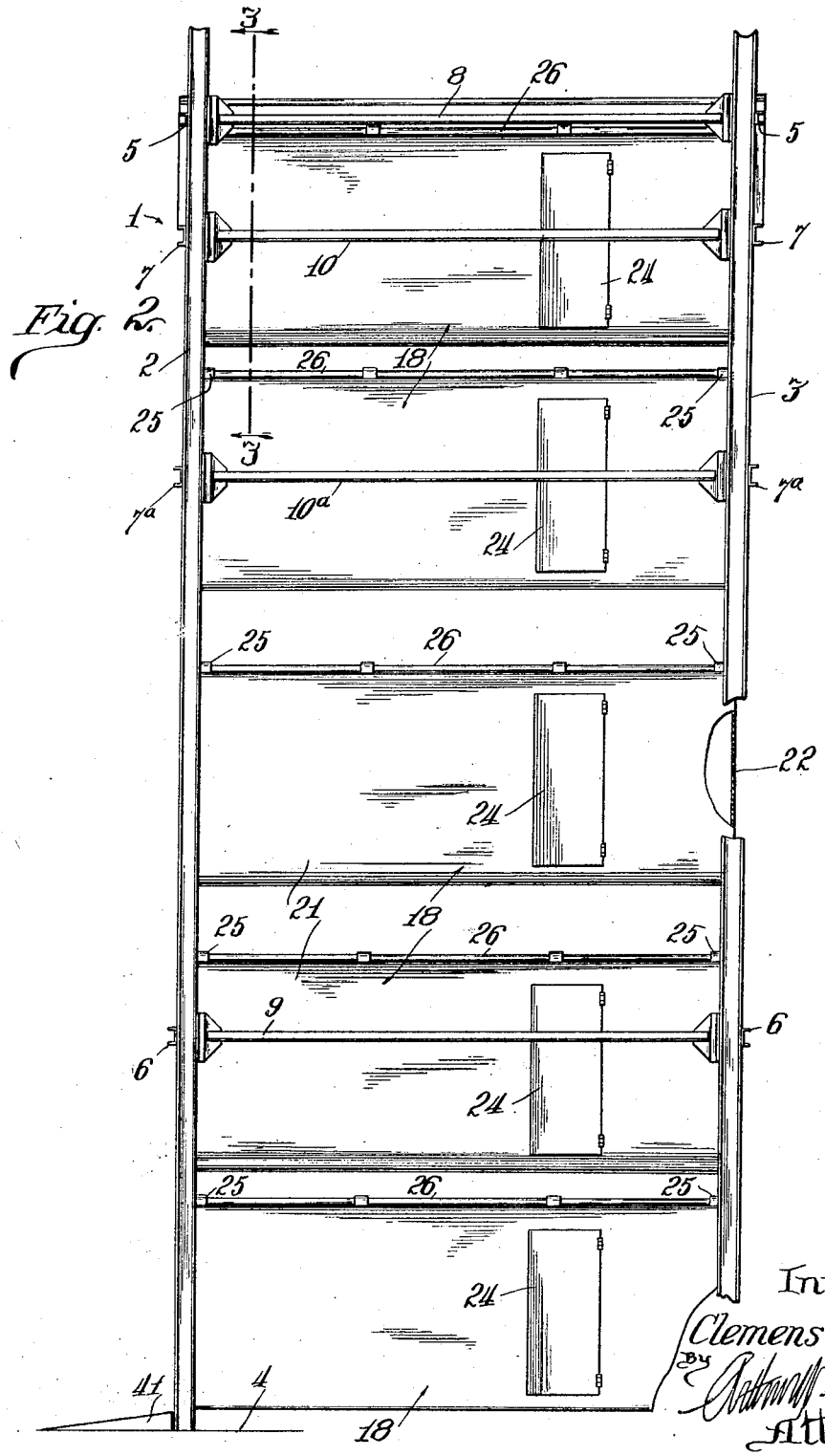
Fig. 2 is a view in side elevation of said unit as when viewed in the direction of the arrows associated with the line 2—2 of Fig. 1.

Referring now in detail to that embodiment of the invention illustrated in the accompanying drawing, 1 indicates as a whole a portion of the structural frame work associated with one of a plurality of units or sections of my improved storage apparatus. Said structural frame work includes pairs of upright front and rear structural members in the form of I beams 2 and 3 respectively, all suitably anchored at their bottom ends in the cement floor 4 of a garage building. Said I beams are spaced the desired lateral distance apart and are arranged with the flanges of the beams of one pair facing those of the other pair. The like beams of each pair are connected together and to the like beams of adjacent units by top, bottom and intermediate channels 5, 6, 7 and 7a respectively, as best shown in Figs. 1 and 2. The front beams of each pair are connected to the rear beams by top, bottom and intermediate members 8, 9, 10 and 10a respectively, made of angle bars arranged in the planes of the webs of the I beams of said pairs of upright members. The structural members just mentioned provide a portion of a skeletonized frame upon which the other members of the apparatus are mounted as will now be described.

11—11 indicates front and rear upright endless tracks, each arranged in the planes of the I beams of the front and rear beams of each pair of upright members. Each track comprises upright side portions 12 and 13 respectively, each spaced an equal distance from an adjacent upright member and the top ends of said side portions are connected together by a semi-circular top portion 14 while the bottom ends of said side portions are connected together by a similar semi-circular bottom portion 15. The various portions thus described provide an upright disposed endless track. Each portion of the track members 11 is of a box like cross section as best shown in Fig. 4 with a centrally disposed slot 16 therein, the slot in one track member facing the slot in the other track member.

Within each track member is a guide comprising laterally spaced upright angle bars 17 which are fixed to the bottom and intermediate channels 6 and 7a respectively. The top and bottom ends of said bars 17 taper toward each other and the bottom end is spaced closer to the semi-circular bottom 15 of the track member 11 than is the top end with respect to the semi-circular top 14 of said track member. The upright angle bars 17 are spaced from the track portions 12 and 13 a distance substantially equalling the distance between said track portions and the upright beams 2 and 3 for a purpose to soon appear.

Associated with the front and rear tracks 11—11 is a plurality of containers or cages 18, each of a size to receive an automobile. Each container as shown herein is substantially box like and is of a height substantially equal to its width and is of a length or depth greater than its height or width. Each container is open at one end, and comprises a top wall 19, a bottom wall 20, side walls 21 and a rear wall 22, and associated with the open front end is a pair of swinging doors 23. In one side wall 21, nearer the rear wall of the container than the front, is a second door 24. Preferably the bottom wall is of peculiar construction in that it is formed with lateral curbs or guides 22a which are spaced apart a distance to guide the wheels of the automobile driven thereinto and to prevent any lateral shifting of the automobile after the same has been driven thereinto. This construction thus centralizes the automobile for an equal distribution of its weight so that the container which is suspended from above in a manner soon to appear, cannot tilt or sway to one side or the other as the container is thereafter moved into storage position. On the top wall of each container along its median line is a plurality of upright bearing ears 25 best shown in Fig. 5. Journalled in said ears is a shaft 26 the ends of which extend through the slots 16 and into the box like channels forming the front and rear tracks 11—11. The extreme ends of each shaft are reduced in diameter as best shown at 26a in Fig. 7.

Trained about each endless track is a chain 27 which as best shown in Figs. 6 and 7 comprises pairs of spaced side links 28 connected by pins or pintles 29. Certain of said pintles are omitted and the reduced end portions 26a are employed in their stead as best shown in Fig. 7, and on said pintles and shaft ends, between the links of each pair are journalled rollers 30, of a diameter slightly less than that of the box like channel constituting the tracks 11—11.

Each pair of spaced side links 28 have short, longitudinal slots 28a therein at one end and have holes 28b therein at the other end, the several pintles and reduced end portions of the shafts passing through said links, slots and holes as best shown in Fig. 7 for a purpose later to appear.

The ends of one shaft are connected to the ends of the shaft of the adjacent container by means of links or bars 31 which are preferably arranged in the plane between the ends of said containers and the box like channel constituting the track 11. On each side wall of each container near the ends thereof are laterally extending brackets 32 in each of which is journalled a roller 32a, which rollers are adapted to have a rolling engagement with the webs of the upright beams 2—3 and with the opposed flanges of the upright guide members 17—17.

33 indicates a shaft arranged parallel with the shafts 26, and which is journalled at its ends in suitable blocks 34—34 resting upon the top channels 5—5 in a plane which is midway between the uprights 2—2 and 3—3 respectively. Fixed to this shaft in the planes of the track members 11—11 are front and rear sprockets 35—35 which extend at their bottom portions through suitable cut away parts of said track members, into the interior thereof so as to mesh with the rollers 30—30 of the respective chains. Also fixed to said shaft to the rear of the front sprocket is a worm gear 36 which meshes with a worm 37 fixed on a second shaft 38. This last mentioned shaft is journalled in bearings 38a carried by the front channel 5 and said shaft is operatively connected by a coupling 39 to the armature shaft of an electric motor 40.

The operation of the apparatus is as follows:

Assume that the parts are in the position shown in Fig. 1 wherein one of the containers marked "A" is at the bottommost position in the apparatus. As best shown in Fig. 1, the bottom wall or floor 22 of the container is located a short distance above the floor 4 of the garage. On said floor is placed a ramp 41 as best shown in Fig. 1 whereby after the doors 23 of said containers "A" are opened, an automobile may be driven into the same. When the automobile is in the container, the operator of the automobile may leave the container through the door 24 thereof, which is placed conveniently in position with respect to the door of the automobile when the same is within said container.

The doors 23 have suitable locking mechanisms which are then closed and locked, after which the motor 40 is started. Through the shafts 33 and 38 and the various worm gears and sprockets thereon, a driving movement is imparted to the chains 27—27 whereby all the containers move simultaneously; those engaged with the track portions 12 moving upwardly and those engaged with the track portions 13 moving downwardly as indicated by the arrows in Fig. 1. The container "A" is thus moved into the position formerly occupied by the container marked "B" while the container marked "C" moves into the position formerly occupied by the container "A", and ready to either take an automobile or discharge one by backing the same out of the container and down the ramp 41. As the container marked "A" sweeps around the upwardly curved portion of track parts 15, the rollers 32a on the left hand side thereof engage the webs of the left hand uprights 2—3 so that they are held against swinging or swaying under the action of the automobile therein.

Should the owner of the automobile stored in the top-most container marked "D" desire to withdraw his automobile therefrom, the motor 40 would be started and run until the said container would occupy the position of the container marked "A". When all the containers are occupied, those travelling downwardly will act to counterbalance those travelling upwardly so that there is no great starting torque imposed upon the motor which therefore may be a substantially small one.

It is pointed out that as the link 28 of the chains 27 pass around the curved top and bottom parts 14 and 15 of the track, the slots 28a in the links permit an elongation of these parts of the chains between two of the shafts 26—26, which is ordinarily limited by the length of the bars 31—31 connecting said shaft. As soon as said chain fails to enter the straight parts of tracks, the slots in said links permit a shortening of the chain parts between said shaft 26—26 as is apparent.

By means of the worm gear drive the chains 27 are locked when the motor is stopped so that there is no chance of the weight produced by the filled containers acting to make the chain move in a reverse direction. By means of my improved apparatus, it is possible to make use of all available space in a garage and therefore more automobiles may be stored in garages having limited floor space. This is apparent in Fig. 1 where a complete storage unit or section is illustrated in the position it occupies with respect to adjacent units or sections.

While in describing my invention, I have referred to many details of construction as well as form and arrangement of the parts thereof. The same is to be considered as by way of illustration only, so that I do not wish to be limited thereto except as may be pointed out in the appended claims.

I claim as my invention:

1. An apparatus of the kind described embodying therein, a pair of endless track members, an endless chain comprising links and pintles, trained about each track member, a plurality of shafts, each having an end taking the place of a pintle in said chains, rigid members connecting said shafts together near said chains, rollers on said pintles and shaft ends engaging said track members, a container suspended from each shaft, and driven sprockets, engaging the rollers for driving said chains.

2. An apparatus of the kind described embodying therein, a pair of endless track members each of a box like channel cross section and having a slot therein, with the slots of said track members facing each other, a chain comprising links and pintles trained about and within each track member, a plurality of shafts, each having its ends projecting into each track member through the slots thereof and taking the place of certain of said pintles, a container suspended from each shaft, rigid means disposed between said chains and containers and connecting said shafts together, rollers on said pintles and shaft ends engaging portions of the track members and means for imparting movement to said chains.

3. An apparatus of the kind described embodying therein, a pair of endless track members each of a box like channel cross section and having a slot therein, with the slots of said track members facing each other, a chain comprising spaced pairs of links and connecting pintles trained about and within each track member, a plurality of shafts, each having its end parts projecting into each track member through the slots thereof, the extreme ends of said shafts being reduced in diameter and taking the places of some of said pintles rigid bars connecting said shafts together near their ends, rollers on said pintles and reduced end parts of said shafts between the links of each pair, said rollers engaging portions of the track members and driven sprockets engaging the rollers for driving said chains.

4. An apparatus of the kind described embodying therein, a pair of endless track members, an endless chain trained about each track member, a plurality of shafts each operatively connected at one end to the respective chains, bars pivotally connecting the respective ends of adjacent shafts, a container suspended from each shaft and means engaged with said chains for moving them about said track members.

5. An apparatus of the kind described embodying therein, a pair of endless track members each of a box like channel cross section and each having a slot therein with the slots of the track members facing each other, a chain comprising links and pintles trained about but within each track member, a plurality of shafts, each having its ends projecting through said slots and into each track member and taking the places of some of said pintles, a container suspended from each shaft, bars connecting said shafts together and disposed between said chains and containers, rollers on said pintles and shaft ends respectively engaging portions of the track members and means engaging the said chains and moving them.

6. An apparatus of the kind described comprising uprightly disposed front and rear endless track members each having a rounded top and bottom portion, structural means for supporting said track members, an endless chain trained about and arranged in each track member and comprising links and pintles, a plurality of shafts arranged with their ends in said track members and taking the place of some of said pintles, a container suspended from each shaft, bars connecting said shafts for spacing them apart and arranged without said track members, a drive shaft disposed across the rounded top ends of said track members, a sprocket on each end of the shaft and extending into each track member to engage the chain therein and means for driving said shaft.

7. An apparatus of the kind described embodying therein a pair of endless tracks having substantially straight mid portions and curved end portions, a chain member passing around each track, shafts connecting the chain of one track with the chain of the other track, containers carried by said shafts and bar members connecting adjacent shaft ends, one of said members being so formed as to permit an elongation thereof as said shafts are moved around the curved portions of the tracks.

8. An apparatus of the kind described embodying therein a pair of endless tracks having substantially straight mid portions and curved end portions, a chain member passing around each track, shafts connecting the chain of one track with the chain of the other track, containers carried by said shafts and bar members connecting adjacent shaft ends, said chain members being so formed as to permit an elongation of certain parts thereof as the shafts are moved thereby around the curved portions of the tracks.

9. An apparatus of the kind described embodying therein, a pair of endless track members having substantially straight mid portions and curved end portions, a link chain passing around each track member, said links having elongated holes therein, pintles connecting said links together, shafts connecting the chain in one track member with the chain in the other member and having ends which take the place of certain of said pintles, containers carried by said shafts and bars connecting said shafts together and disposed between said chains and containers, said links permitting an elongation of those parts of the chains between said shafts as said shafts are moved about the curved end parts of said track members.

In testimony whereof, I have hereunto set my hand, this 14th day of April, 1927.

CLEMENS MUZYN.